US010154469B2

(12) United States Patent
Narasimha et al.

(10) Patent No.: US 10,154,469 B2
(45) Date of Patent: *Dec. 11, 2018

(54) HANDOVER DURING CARRIER AGGREGATION OPERATION IN WIRELESS COMMUNICATION NETWORK

(71) Applicant: Google Technology Holdings LLC, Mountain View, CA (US)

(72) Inventors: Murali Narasimha, Lake Zurich, IL (US); Ravi Kuchibhotla, Gurnee, IL (US); Ravikiran Nory, Buffalo Grove, IL (US); Gerrit Hiddink, Utrecht (NL)

(73) Assignee: Google Technology Holdings LLC, Mountain View, CA (US)

( * ) Notice: Subject to any disclaimer, the term of this patent is extended or adjusted under 35 U.S.C. 154(b) by 215 days.

This patent is subject to a terminal disclaimer.

(21) Appl. No.: 14/450,396

(22) Filed: Aug. 4, 2014

(65) Prior Publication Data

US 2014/0341166 A1   Nov. 20, 2014

Related U.S. Application Data

(63) Continuation of application No. 13/052,266, filed on Mar. 21, 2011, now Pat. No. 8,874,117.

(Continued)

(51) Int. Cl.
*H04W 36/00* (2009.01)
*H04W 56/00* (2009.01)
(Continued)

(52) U.S. Cl.
CPC .......... *H04W 56/001* (2013.01); *H04L 5/001* (2013.01); *H04L 5/0007* (2013.01);
(Continued)

(58) Field of Classification Search
None
See application file for complete search history.

(56) References Cited

U.S. PATENT DOCUMENTS

| | | | |
|---|---|---|---|
| 2007/0275723 A1* | 11/2007 | Jeong | H04B 7/2681 455/436 |
| 2008/0267127 A1* | 10/2008 | Narasimha | H04W 36/0077 370/331 |

(Continued)

FOREIGN PATENT DOCUMENTS

| | | |
|---|---|---|
| CN | 101690318 | 3/2010 |
| CN | 101690319 A | 3/2010 |

(Continued)

OTHER PUBLICATIONS

Patent Cooperation Treaty, "PCT Search Report and Written Opinion of the International Searching Authority" for International Application No. PCT/US2011/034930 Aug. 4, 2011, 15 pages.

(Continued)

*Primary Examiner* — Yemane Mesfin
*Assistant Examiner* — Jeff Banthrongsack
(74) *Attorney, Agent, or Firm* — Lerner, David, Littenberg, Krumholz & Mentlik, LLP

(57) ABSTRACT

Methods for performing handovers and addition of carriers during carrier aggregation operation are described. A mobile station can indicate failure to perform downlink synchronization to some but not all cells of a target eNB, in response to a handover command. The mobile station can activate carriers based on various combinations of transmission of random access preambles, reception of random access response messages and transmission of handover complete messages. A base station can activate carriers based on various combinations of reception of random access pre- (Continued)

ambles, transmission of random access response messages and reception of handover complete messages.

5 Claims, 9 Drawing Sheets

Related U.S. Application Data

(60) Provisional application No. 61/331,353, filed on May 4, 2010.

(51) Int. Cl.
*H04L 5/00* (2006.01)
*H04W 36/08* (2009.01)
*H04W 24/02* (2009.01)
*H04W 28/04* (2009.01)
*H04W 74/08* (2009.01)
*H04W 92/20* (2009.01)

(52) U.S. Cl.
CPC ....... *H04L 5/0098* (2013.01); *H04W 36/0005* (2013.01); *H04W 36/08* (2013.01); *H04W 24/02* (2013.01); *H04W 28/04* (2013.01); *H04W 74/0833* (2013.01); *H04W 92/20* (2013.01)

(56) References Cited

U.S. PATENT DOCUMENTS

| | | | |
|---|---|---|---|
| 2009/0270103 A1 | 10/2009 | Pani et al. | |
| 2009/0310563 A1* | 12/2009 | Chou | H04L 27/0006 370/331 |
| 2010/0159932 A1* | 6/2010 | Park | H04W 36/28 455/436 |

FOREIGN PATENT DOCUMENTS

| | | |
|---|---|---|
| WO | 2009149665 A1 | 12/2009 |
| WO | 2009155480 A1 | 12/2009 |

OTHER PUBLICATIONS

3GPP TSG RAN WG2 #69, R2-101144 "Handover with Carrier Aggregation" MediaTek Inc., San Francisco, USA, Feb. 22-26, 2010, 6 pages.
3GPP TSG RAN WG2 #59bis, R3-080623 "Partial Handover" Ericsson, Shenzhen, CN, Mar. 31-Apr. 3, 2008, 4 pages.
3GPP TSG RAN2 #69bis, Tdoc R2-1 02359, "Hand over—stage 2 level issues" Samsung, Beijing, P.R. China, Apr. 12-16, 2010, 6 pages.
Chinese Office Action for Application No. 201180022535.3 dated Dec. 2, 2014.

* cited by examiner

HANDOVER DURING CARRIER AGGREGATION OPERATION IN WIRELESS COMMUNICATION NETWORK

CROSS REFERENCE TO RELATED APPLICATIONS

The present application is a continuation application of U.S. patent application Ser. No. 13/052,266, filed on Mar. 21, 2011, which claims priority to U.S. provisional Application No. 61/331,353 filed on May 4, 2010, the disclosures of which are incorporated herein by reference.

FILED OF THE DISCLOSURE

The present disclosure relates generally to wireless communications, and more specifically to Carrier Aggregation.

BACKGROUND

Carrier Aggregation will be used in 3GPP LTE networks to provide improved data rates to users. Carrier aggregation consists of transmitting data to or receiving data from the UE on multiple carrier frequencies referred to herein as "component carriers" or "carriers". The wider bandwidth enables higher data rates.

The present disclosure considers the problem of performing handover of a mobile station from a source base station (also known as source node-B, source evolved-node-B, or source eNB) to a target base station (also known as target node-B, target evolved-node-B or target eNB) when Carrier aggregation (CA) is in use. The currently specified LTE handover procedure supports handover of a mobile station while operating on a single carrier (i.e. in the absence of carrier aggregation).

For carrier aggregation (CA) operation, a mobile station (also referred to as user equipment or "UE") can be configured with a set of component carrier (CCs). Component carriers can be downlink (DL) component carriers (used for transmission from an eNB to UEs) or uplink (UL) component carriers (used for transmission from UEs to eNBs). Typically, each uplink CC has a corresponding downlink CC to which it is paired. The pairing normally ensures that if the UE transmits a random access preamble on an uplink CC, the response message to the random access preamble transmission is received on the paired downlink CC. There can be situations where a downlink CC is configured but the paired uplink CC is not configured, and vice versa. Some of the configured CCs may be activated. The activated CCs can be used to send and receive data (i.e., the activated CCs can be used for scheduling) to and from the UE. The UE has up to date system information for all configured CCs or at least the configured CCs that the network expects to activate. Therefore, after a CC has been configured, it can be quickly activated, without experiencing the delay due to delivery of relevant system information needed to perform communication on such a CC. Thus, when there is a need for aggregating multiple CCs (e.g., a large burst of data), the network can activate configured CCs. The maintenance of a configured CC set in addition to an activated CC set enables battery conservation in the UE by ensuring that CCs need to be activated only when there is a substantial amount of data to be transmitted.

The currently specified LTE handover procedure requires the network to first bring the set of activated CCs down to a single CC before the handover. The network can re-activate CCs as needed after the handover is completed. The problem with such a handover procedure is that when carrier aggregation is being used, it can cause significant inefficiencies and delays in the data transfer. As mentioned above, carrier aggregation is expected to be used (i.e., multiple CCs are expected to be activated) only when there is a substantial amount of data to be transmitted). If a handover occurs during such a data transfer, this option would result in buffering of large quantities of data at the source eNB and subsequent transfer of the data to the target eNB (and possibly also buffering of large quantities of data at the UE). It can also cause excessive buffering of data at the target eNB as re-activation of CCs at the target eNB can take significant time after the handover.

Therefore it is beneficial to have handover mechanisms that are more suitable for carrier aggregation operation.

DETAILED DESCRIPTION

Figure 1:
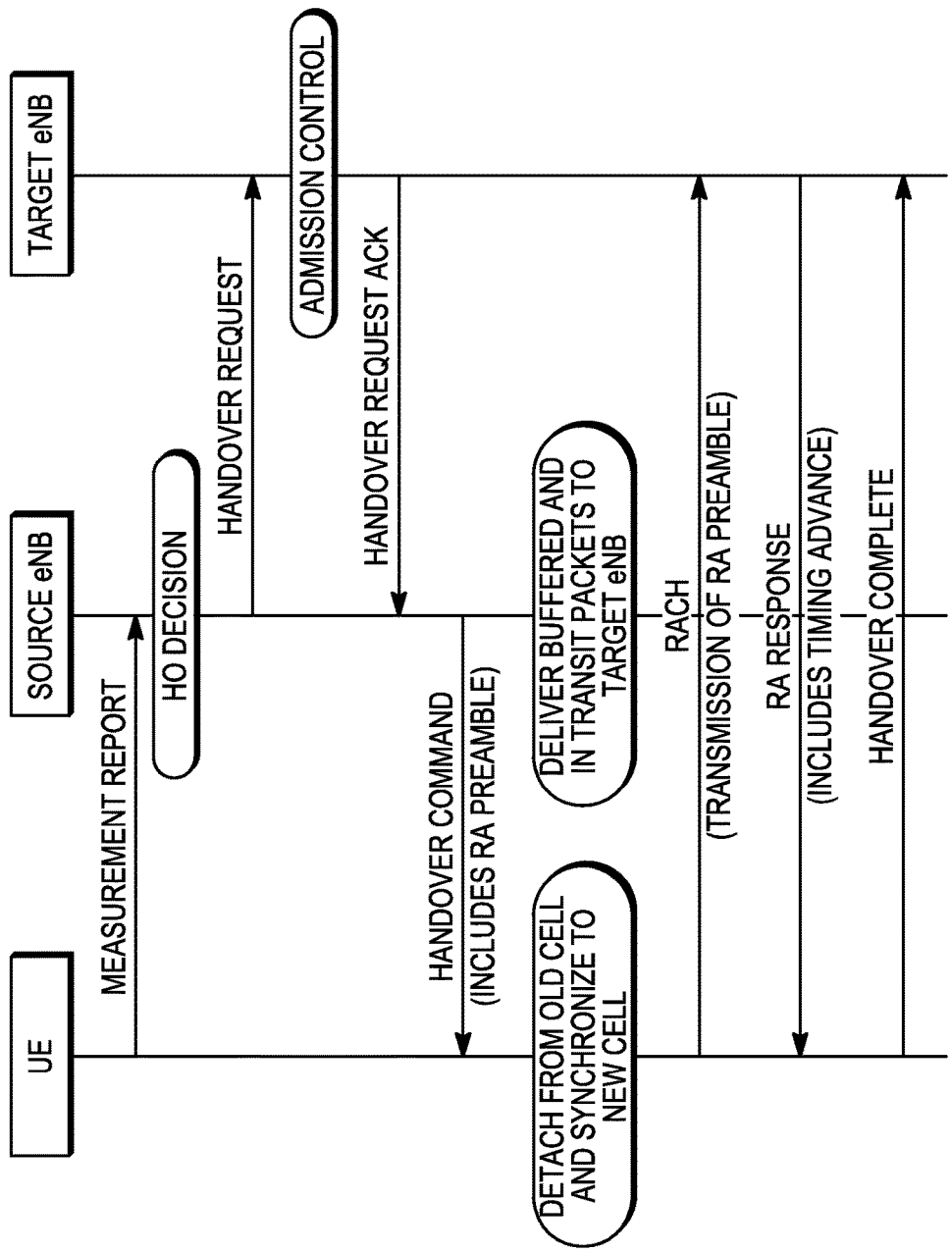
FIG. 1 shows a handover procedure that can be used in the absence of carrier aggregation.
Figure 2:
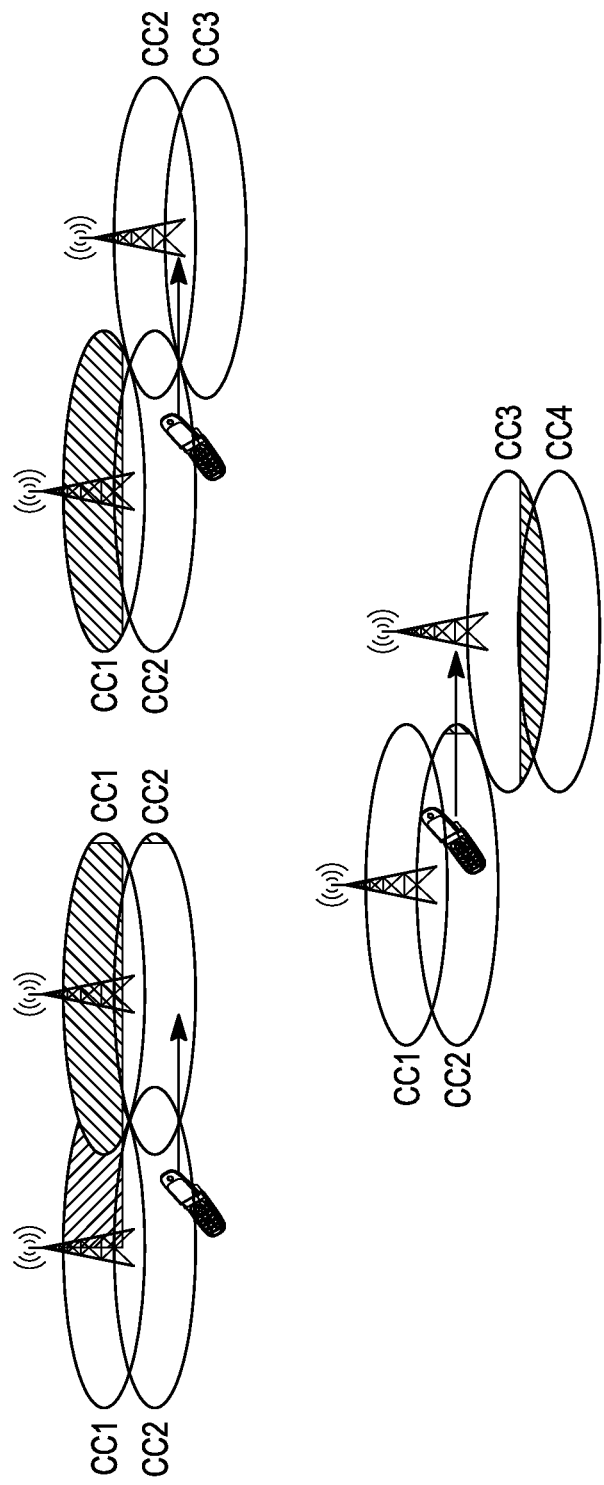
FIG. 2 shows the component carrier coverage scenarios that a handover procedure needs to support in the presence of carrier aggregation.

A method for handover during carrier aggregation operation enables a handover procedure which overcomes the deficiencies described above. The embodiments are described in terms of a 3GPP Long term Evolution (LTE) system; however, it should be clear that the invention and the embodiments are equally applicable to other wireless communication systems. The scenarios which the handover procedure needs to address are summarized below and also illustrated in FIG. 2:

Same component carriers used for carrier aggregation in both the source eNB and the target eNB;

At least one common component carrier used for carrier aggregation in both the source eNB and the target eNB; and No component carriers in common among components carriers used for carrier aggregation in the source eNB and the target eNB.

In a Frequency division duplex (FDD) system, a downlink CC has a corresponding uplink CC. As in LTE Release 8 an accurate timing advance is needed to transmit on an uplink CC. The timing advance value is primarily a function of the propagation characteristics of the frequency. A single timing advance is normally adequate when all uplink CCs in use belong to the same frequency band. However, different timing advance values for different uplink CCs may be needed in the following situations:

The uplink CCs belong to different frequency bands;

The network employs repeaters or remote radio heads; and

A base station uses different sectorization on different frequencies (for example, an eNB may use 3 sectors on CC1 and 6 sectors on CC2, leading to different propagation characteristics due to the different antennae).

Some embodiments are directed at handover when only a single timing advance is needed for all uplink CCs. Other embodiments are directed at handover when more than one timing advance is needed for the uplink CCs.

Figure 3:
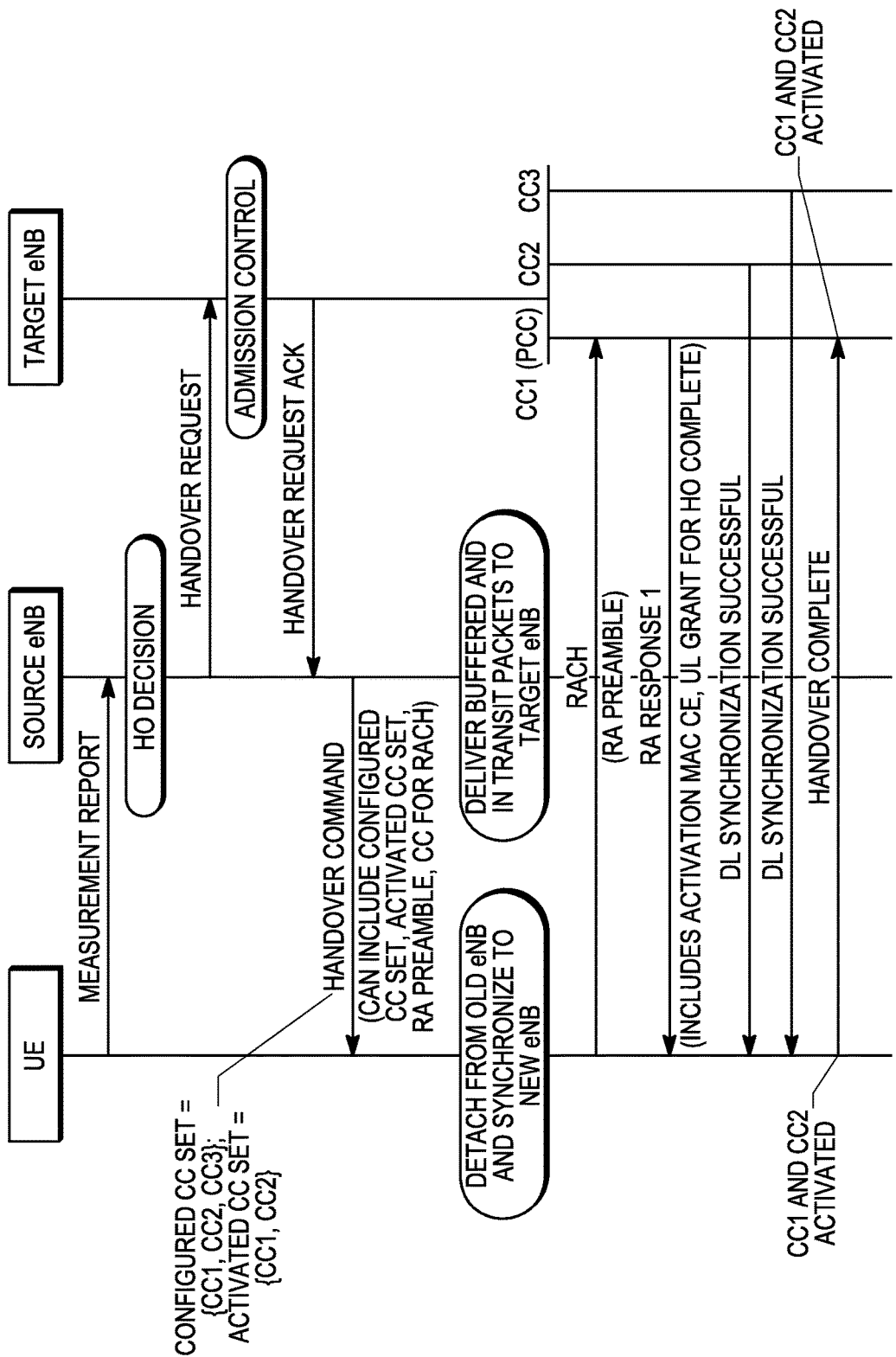
FIG. 3 illustrates a method for handover during carrier aggregation operation when multiple CCs are configured and activated upon handover.

According to a first embodiment, illustrated in FIG. 3, the handover command may signal (a) the set of CCs to be configured by the UE upon handover, and (b) the set of CCs to be (configured and) activated upon handover. The handover command may also signal the CC on which the UE is required to transmit a RACH preamble (the RACH preamble may also be signaled). The handover command may be generated by the target eNB and delivered to the UE through the source eNB. Alternatively, the handover command may be generated by the source eNB and directly delivered to the UE by the source eNB.

The handover complete serves as an indication that that the UE is ready to receive PDCCH on all of the CCs to be configured and activated. Alternatively, the handover complete can serve as an indication that the UE is downlink synchronized on all the CCs and subsequently the network can activate individual CCs. In a first step the UE can send a measurement report. The measurement report can trigger an inter-eNB handover. The target eNB can determine the CC set to be used upon handover and the uplink CC on which the UE can transmit a random access channel preamble (RACH preamble). In order to enable the target eNB to select CCs of good signal strength or signal quality, the source eNB can optionally forward measurement information reported by the mobile station. Alternatively, the source eNB can determine the CC set to be used upon handover and the uplink CC on which the UE can transmit a RACH preamble. A handover command is transmitted to the UE that can indicate the set of downlink CCs to be configured upon handover (CC set 1) and the set of downlink CCs to be activated upon handover (CC set 2). The handover command can also indicate a specific random access preamble that the UE is required to use as a part of the handover procedure.

The UE can transmit a random access preamble and receive a random access response. The UE can then transmit a handover complete message. The transmission of the random access preamble and the handover complete message can occur on different uplink CCs. If CC set 2 was included in the handover command, upon transmitting the handover complete, the UE can consider each of the CCs in CC set 2 to be activated. The UE can then monitor each of the CCs in CC set 2 for a physical downlink control channel (PDCCH) or any other control channel. In order to be able to monitor a CC for a control channel, the UE needs to first perform downlink synchronization to the cell from which the control channel is expected. Alternatively, upon transmitting the handover complete message, the UE can consider a single downlink CC to be activated (for example, the CC on which the random access response was received). The target eNB can then individually activate other CCs as needed.

Figure 4:
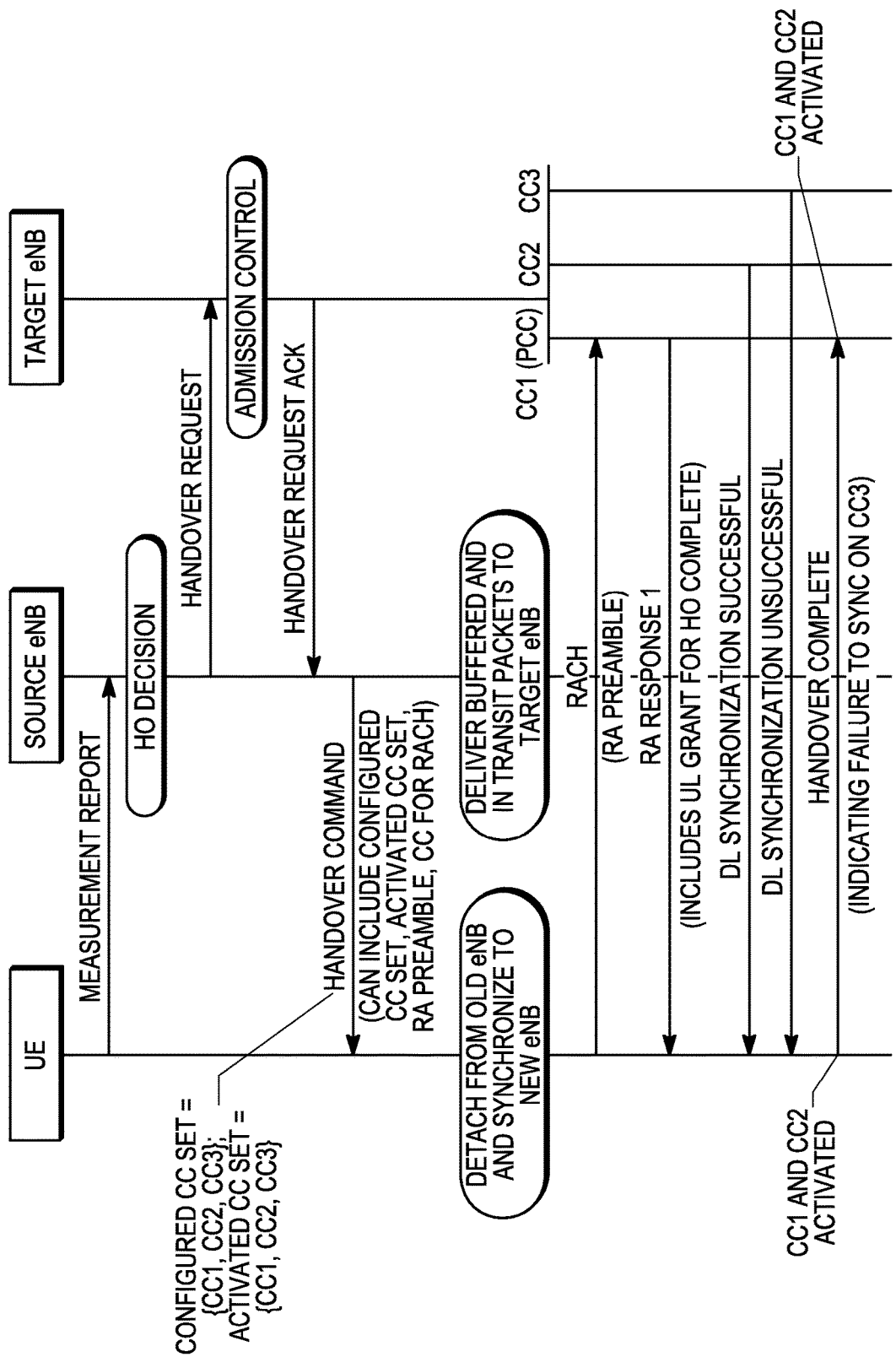
FIG. 4 illustrates a method for handover during carrier aggregation operation when multiple CCs are configured and activated upon handover and the mobile station can indicate failure to activate some of the CCs.

In some cases, the UE may not be able to perform downlink synchronization to one or more of the CCs in CC set 2 (for example, the UE may not be able to detect a synchronization channel on one or more of the CCs in CC set 2). According to a second embodiment illustrated in FIG. 4, if the UE is unable to perform downlink synchronization on the DL CC paired to the UL CC on which it is expected to perform the RACH transmission, then the handover is considered to have failed and a radio link recovery procedure can follow. If the UE is unable to perform downlink synchronization on a DL CC that is not paired to the UL CC on which it is expected to perform the RACH transmission, then the handover complete message can indicate the CCs on which the UE does not have downlink synchronization. This allows for the case of "partial success" of the handover—the target eNB can continue communication with the UE on the at least one CC that the UE has successfully DL synchronized to and try to activate alternate CCs for aggregation.

According to another embodiment, the handover command can configure multiple CCs of the target eNB (CC set 1) and designate multiple CCs to be activated (CC set 2). One CC pair (DL CC & UL CC) of the target can be designated for the random access procedure for handover, or alternatively, the UE can pick a CC pair for the random access procedure for handover from the configured CCs. The UE can perform DL synchronization on all the configured DL CCs (CC set 1) and can perform UL sync on one of the configured UL CC. At handover completion the multiple CCs designated for activation (CC set 2) on the target eNB are considered activated. Consequently, the UE can monitor each of the CCs in CC set 2 for a physical downlink control channel (PDCCH) or any other control channel. If the UE is not able to perform DL synchronization to one or more of multiple CCs configured or designated for activation, then a subset of the CCs is activated (the ones on which the UE was able to perform DL synchronization) and the UE can indicate the failure to perform DL synchronization on some CCs to the network (for example, in the handover complete message). Upon completion of the handover the target eNB can activate additional DL CCs from the configured set.

Figure 5:
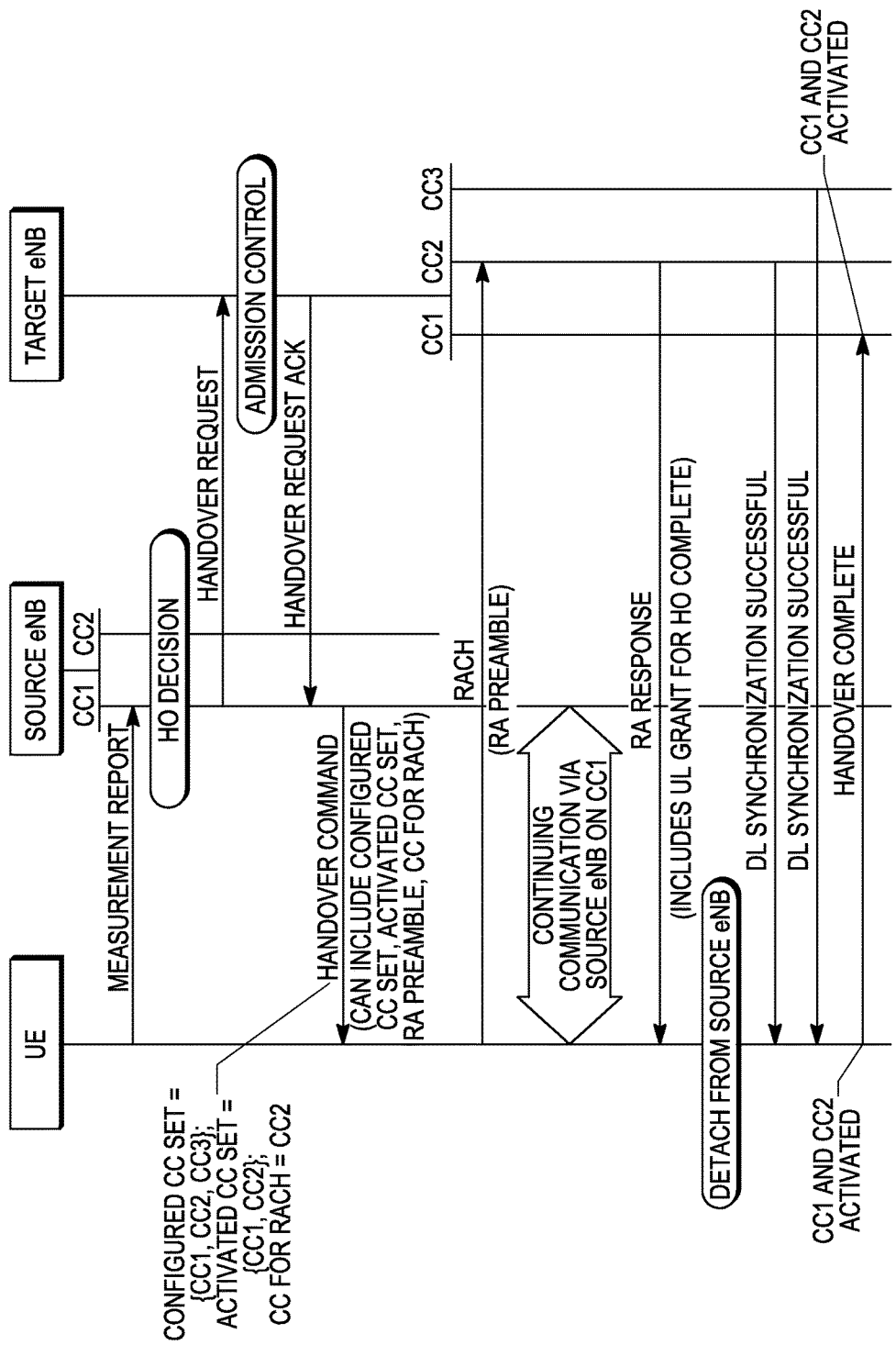
FIG. 5 illustrates a method for handover during carrier aggregation operation that reduces the interruption during a handover with carrier aggregation.

According to another embodiment illustrated in FIG. 5, the UE can determine whether the CC on which the UE is required to perform random access preamble transmission to the target eNB for handover is an activated CC at the source eNB. If the CC on which the UE is required to perform random access preamble transmission is an activated CC, then the UE can stop looking for control channels on that DL CC and the corresponding UL CC is used for the random access preamble transmission. Meanwhile, DL data can be received from source eNB on the other DL CCs and UL transmissions can be continued on corresponding UL CCs. The UE can receive a timing advance (TA) command from the target eNB (for example, in the random access response message). Upon receiving the TA command, the UE can stop monitoring for control channels on the source eNB CCs and start monitoring for control channels on the target eNB CCs. Such a mechanism can substantially reduce interruption during the handover.

Figure 6:
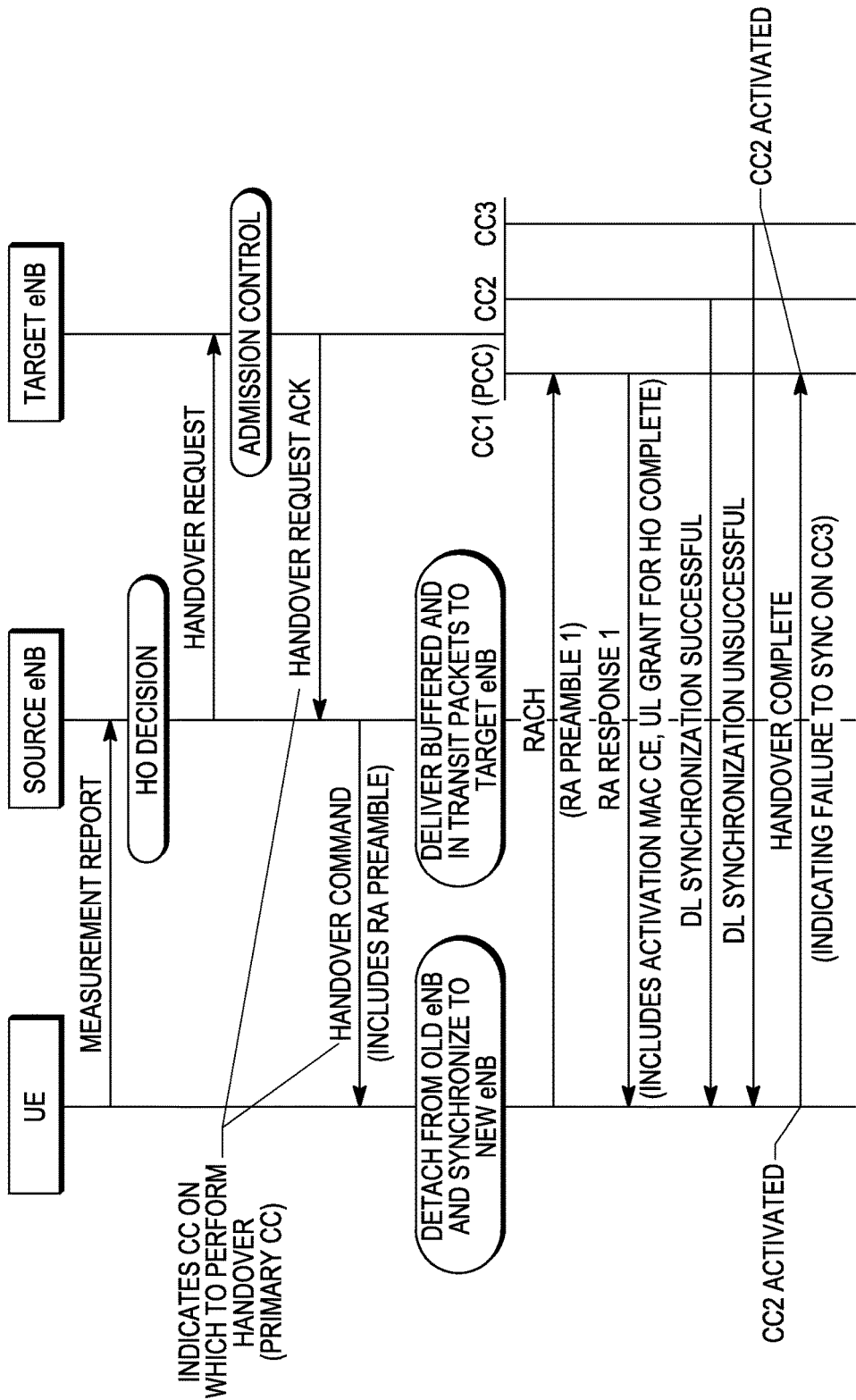
FIG. 6 illustrates a method for activation of additional CCs upon handover using an activation message from the target eNB.

According to another embodiment illustrated in FIG. 6, the handover command can configure multiple CCs (CC set 1) on the target eNB, but a single CC can be designated to be activated regardless of the number of CCs activated at the source eNB. The CC designated to be activated can be referred to as the Primary CC. The UE performs DL synchronization to the CCs in CC set 1. The UE can perform random access preamble transmission on the UL CC corresponding to the CC designated to be activated and receives a random access response. The UE then transmits a handover complete message. After successful handover the target eNB can activate additional CCs from the configured set. Being synchronized to the multiple DL CCs of the target eNB ensures that the target eNB can quickly activate them after handover.

In order to activate additional CCs after handover, the target eNB can use an activation message, such as a MAC (medium access control) message indicating CC activation. Such a message will be referred to as an activation message or a MAC activation message. The activation message can be sent by the target eNB, with the random access response message, if the target eNB can determine the identity of the UE based on the random access preamble that is received. The target eNB can determine the identity of the UE based on the random access preamble, if a pre-assigned dedicated preamble is used for the random access during the handover. The UE can then perform activation of the CCs indicated in the activation message and then transmit a handover complete message. Upon transmission of the handover complete message, the UE can monitor the activated CCs for control channels. However, the UE may not be able to successfully activate all the CCs indicated in the activation message. This may be due to (a) there not being enough time from the reception of the activation message to the transmission of a response to the activation message (such as the handover complete) for the UE to perform downlink synchronization to the cells of the target eNB on the CCs indicated in the activation message, or (b) UE not having performed adequate radio resource management (RRM) measurements on the CCs designated for activation. If the UE is unable to activate one or more CCs indicated in the activation message, it can indicate the failure to activate in the handover complete message.

According to another embodiment, in order to activate additional CCs after handover, the target eNB can use an activation message. The activation message can be sent by the target eNB with the random access response message, if the target eNB can determine the identity of the UE based on the random access preamble that is received. The UE can then perform activation of the CCs indicated in the activation message and then transmit a handover complete message. Upon transmission of the handover complete message, the UE can monitor the activated CCs for control channels. However, the UE may not be able to successfully activate all the CCs indicated in the activation message. This may be due to (a) there not being enough time from the reception of the activation message to the transmission of a response to the activation message (such as the handover complete) for the UE to perform downlink synchronization to the cells of the target eNB on the CCs indicated in the activation message, or (b) UE not having performed adequate radio resource management (RRM) measurements on the CCs designated for activation. In order to reduce the likelihood of activation failure, the UE can maintain additional radio frequency chains activated upon receiving the handover command and use the additional radio frequency chains to perform various activities. Such activities can include performing downlink synchronization to the cells of the target eNB on at least some of the CCs designated for activation and performing measurements on at least some of the CCs designated for activation. Maintaining additional radio frequency chains activated can include retuning or reconfiguring some radio frequency chains that were being used for communication with the source eNB, or activating radio frequency chains that were not in use when the handover command was received.

According to another embodiment directed at activation of CCs in the absence of a handover, a UE can receive an activation message ordering the activation of multiple CCs. The UE may be unable to activate one or more of the indicated CCs due to, for example, the UE not having performed adequate radio resource management (RRM) measurements on the CCs designated for activation. The UE can activate the CCs that it is able to successfully activate. The UE can then indicate to the network the CCs that it is unable to activate.

Further embodiments are described below that are directed at carrier aggregation when multiple timing advance values are needed. For example, if the uplink CCs to be used for carrier aggregation are from different frequency bands, different timing advance values may be needed for the uplink CCs in the different bands. Other situations where there may be a need for different timing advance values include situations where the network uses repeaters or remote radio heads, and situations where the network uses different sectorization on different bands. In such scenarios, the UE may need to perform multiple random access procedures (on different uplink CCs) to obtain the independent timing advance values.

Figure 7:
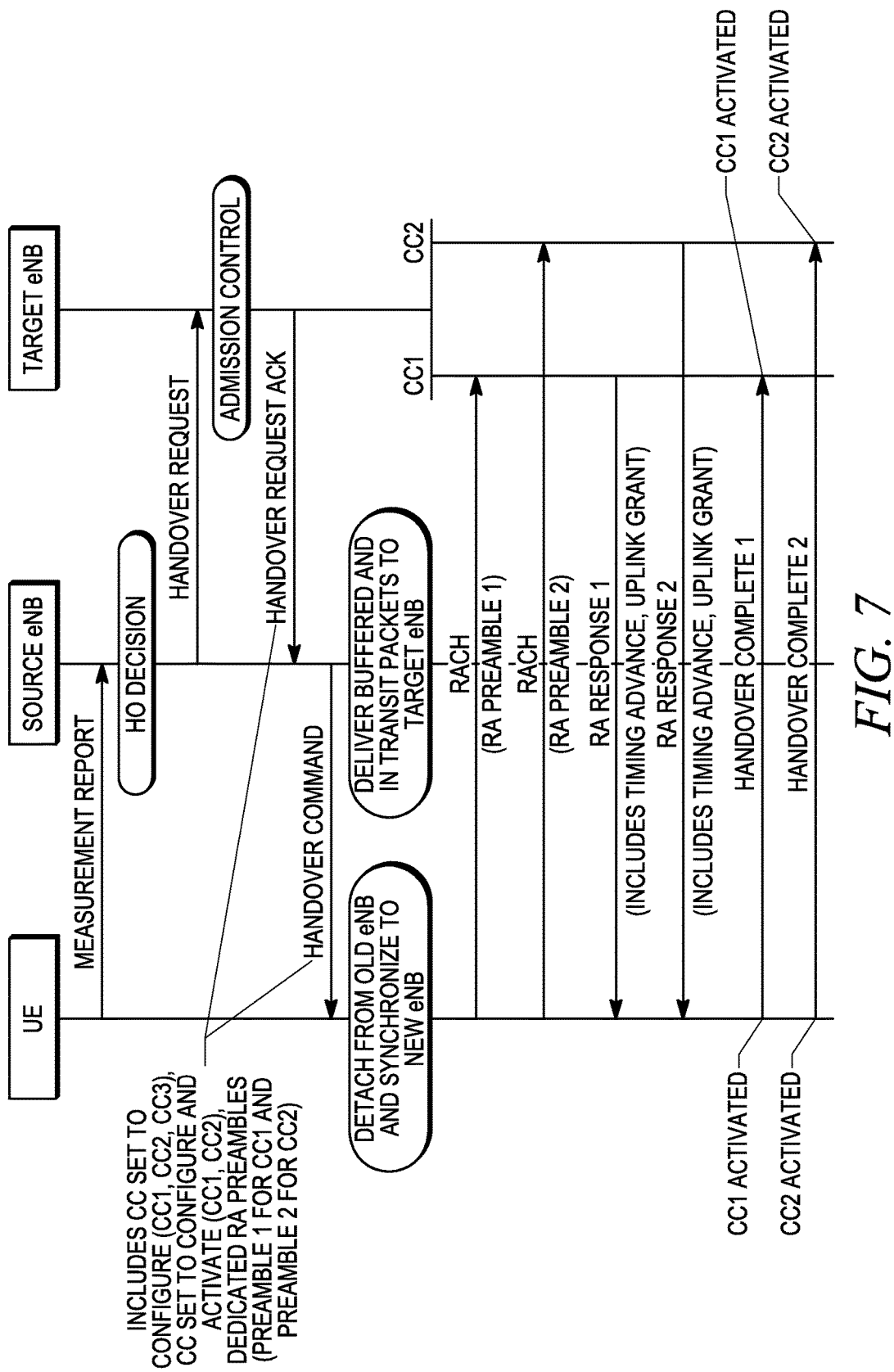
FIG. 7 illustrates a method for handover during carrier aggregation operation when multiple timing advance configurations are necessary wherein multiple handover complete messages are sent.

According to another embodiment illustrated in FIG. 7, the UE sends a measurement report that triggers an inter-eNB handover. The target eNB can determine the CC set to be used by the UE at the target eNB and can determine the uplink CCs on which the UE is required to transmit random access preamble (RACH-CC set). The Network can indicate the sets of downlink CCs to be configured (CC set 1) and to be configured and activated (CC set 2) in the handover command. The network can also provide random access preambles to use on each of the CCs in the RACH-CC set. Alternatively, the source eNB can determine he CC set to be used by the UE at the target eNB and can determine the uplink CCs on which the UE is required to transmit random access preamble (RACH-CC set), and can also provide the random access preambles to use on each of the CCs in the RACH-CC set. The following types of parings are possible between CC set 2 and the RACH-CC set: (a) one downlink CC is paired to one uplink CC in CC set 2, (b) Multiple downlink CCs in CC set 2 are paired to one CC in the RACH-CC set, and (c) Multiple uplink CCs in RACH-CC set are paired to one downlink CC in CC set 2.

The UE can transmit random access preambles on each of the CCs in the RACH-CC set and in response to the random access preamble, receive a random access response message corresponding to the random access preamble transmission. The random access response can include a timing advance value for the corresponding uplink CC.

The UE can then transmit multiple handover complete messages. There can be a correspondence between the handover complete messages and the DL CCs in CC set 2. For example, a handover complete can use an uplink grant signaled in the random access response message. Thus the handover complete message can correspond to all the DL CCs that are paired to the UL CC on which the random access preamble was transmitted. Upon transmitting a handover complete message, the UE can consider all the DL CCs mapped to the handover complete message to be activated. As a consequence, the UE can monitor the downlink CCs corresponding to the handover complete message for control channels. Correspondingly, the target eNB can delay transmitting of control channels to the UE on a downlink CC until it has received the mapped handover complete message.

Figure 8:
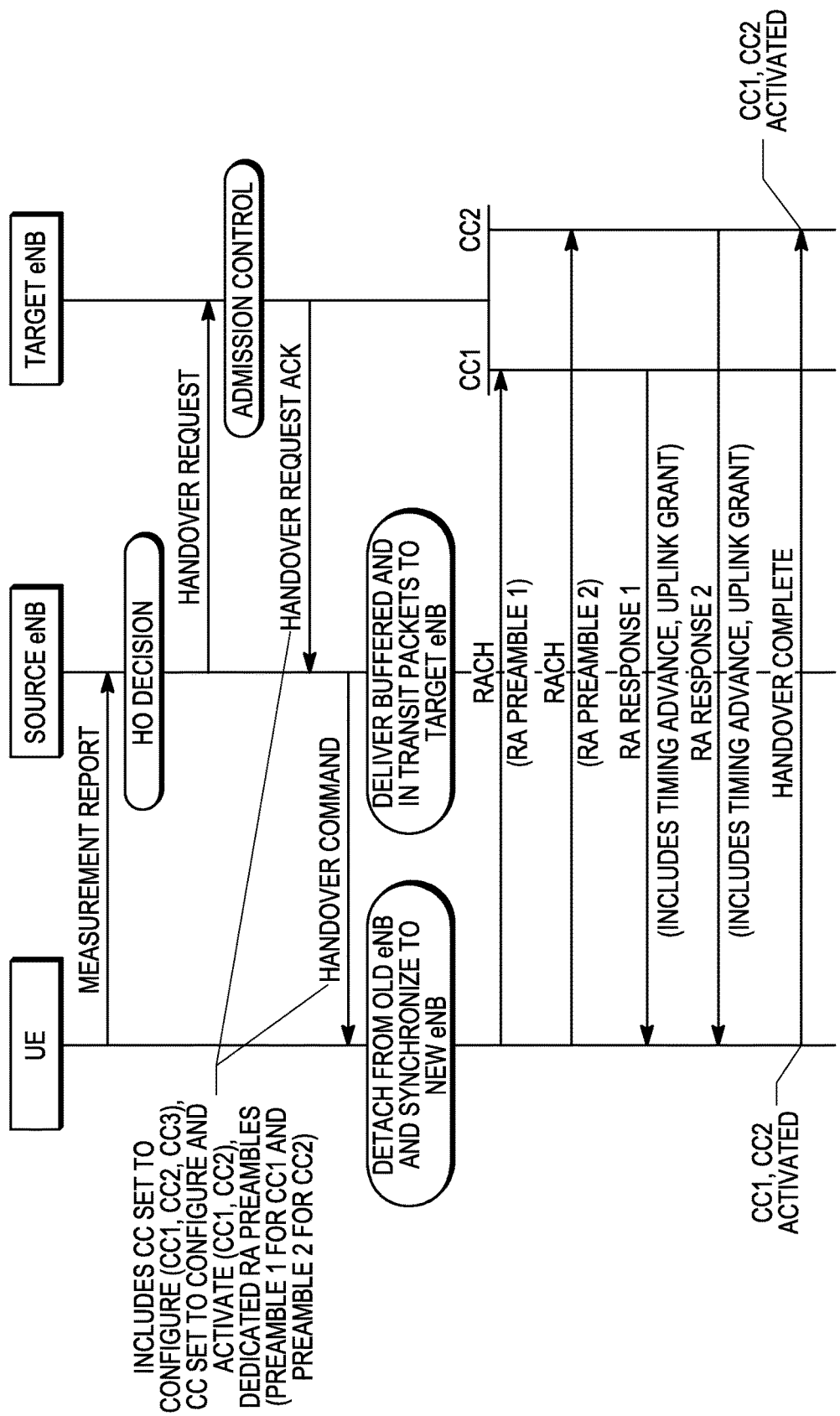
FIG. 8 illustrates a method for handover during carrier aggregation operation when multiple timing advance configurations are necessary wherein a single handover complete message is sent.

According to another embodiment illustrated in FIG. 8, the UE sends a measurement report that triggers an inter-eNB handover. The target eNB or the source eNB can determine the CC set to be used by the UE at the target eNB and can determine the uplink CCs on which the UE is required to transmit random access preamble (RACH-CC set). The Network can indicate the sets of downlink CCs to be configured (CC set 1) and to be configured and activated (CC set 2) in the handover command and can also provide random access preambles to use on each of the CCs in the RACH-CC set.

The UE can transmit random access preambles on each of the CCs in the RACH-CC set and in response to the random access preamble, receive a random access response message corresponding to the random access preamble transmission. The random access response can include a timing advance value for the corresponding uplink CC.

The UE transmits a single handover complete message. The single handover complete message can be transmitted when the last outstanding random access response is received by the UE. The handover complete message can be transmitted using an uplink grant in the last random access response message. Upon transmitting the handover complete, the UE can consider all the CCs in CC set 2 to be activated. Consequently, it can monitor all the CCs in CC set 2 for control channels. Correspondingly, the target eNB can delay transmission of control channels to the UE on any of the CCs in CC set 2 until it has received the handover complete message.

Figure 9:
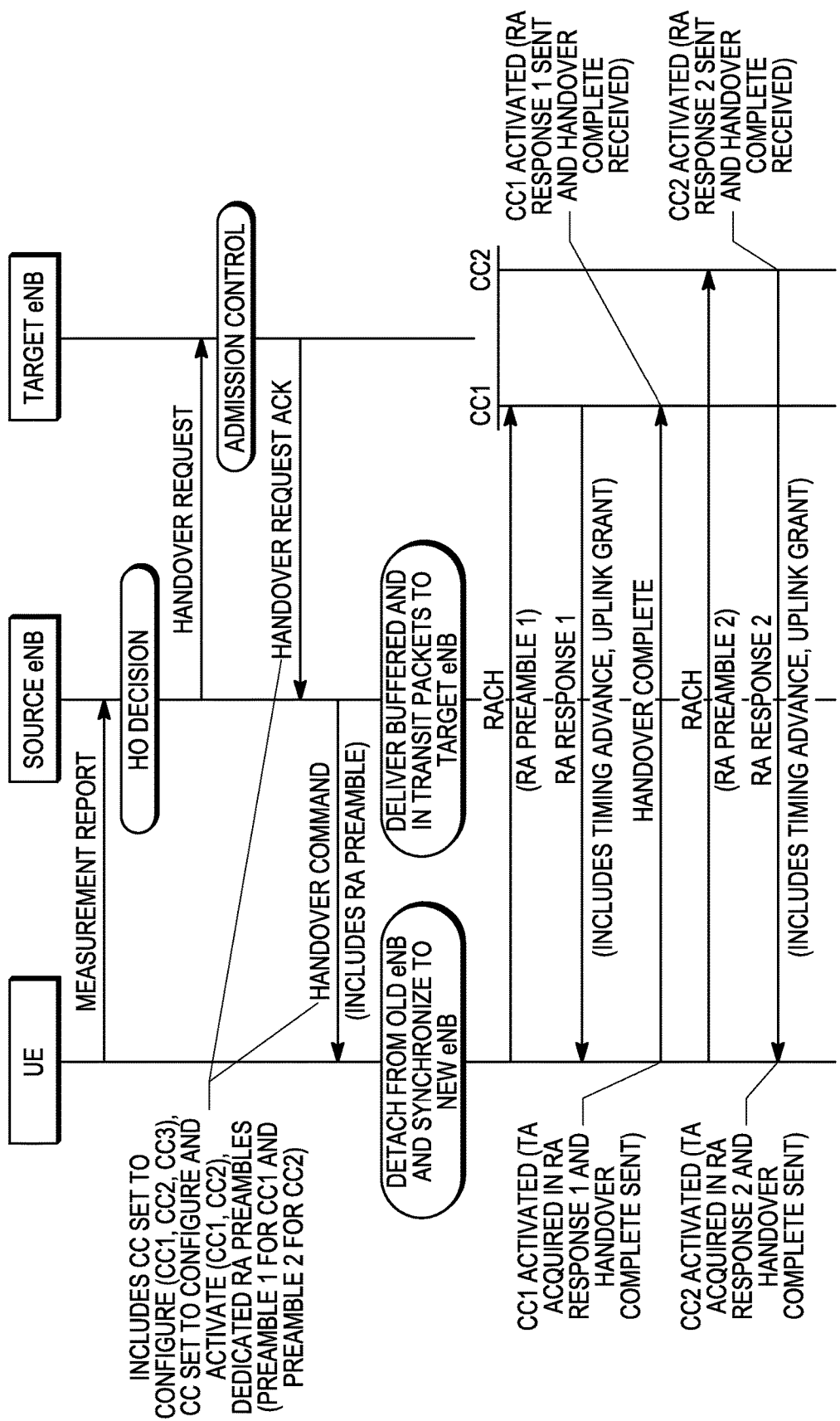
FIG. 9 illustrates a method for handover during carrier aggregation operation when multiple timing advance configurations are necessary wherein a single handover complete message is sent.

According to another embodiment illustrated in FIG. 9, the UE can send a measurement report that triggers an inter-eNB handover. The target eNB or the source eNB can determine the CC set to be used by the UE at the target eNB and can determine the uplink CCs on which the UE is required to transmit random access preamble (RACH-CC set). The Network can indicate the sets of downlink CCs to be configured (CC set 1) and to be configured and activated (CC set 2) in the handover command and can also provide random access preambles to use on each of the CCs in the RACH-CC set.

The UE can transmit random access preambles on each of the CCs in the RACH-CC set and in response to the random access preamble, receive a random access response message corresponding to the random access preamble transmission. The random access response can include a timing advance value for the corresponding uplink CC.

The UE transmits a single handover complete message. The single handover complete message can be transmitted when one of the random access response messages is received. The handover complete message can be transmitted using an uplink grant in the random access response message. Consequently, the UE monitors a DL CC for control channels if the timing advance for the paired uplink CC (or CCs) has been obtained and the corresponding handover complete has been transmitted. Correspondingly, the target eNB does can delay transmission of control channels to the UE on a set of downlink CCs until it has received the designated random access preamble on the corresponding uplink CC and also received the corresponding handover complete. Alternatively, the target eNB can delay the transmission of control channels to the UE on a set of downlink CCs until it has sent a random access response in response to a random access preamble received on the corresponding uplink CCs, and also received the corresponding handover complete.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

It will be appreciated that some embodiments may utilize one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method in a target base station for handover of a mobile station from a source base station to the target base station, the target base station supporting a plurality of cells, each cell of the plurality of cells operating on a different component carrier frequency, the method comprising:
generating, by the target base station, a handover command indicating a first set of cells of the target base station to be configured for communication, wherein the first set of cells comprises more than one cell;
receiving at the target base station a message from the mobile station indicating a partial completion of handover, wherein partial completion of handover indicates that the mobile station was able to perform downlink synchronization with at least one, and less than all, of the first set of cells; and
transmitting, by the target base station, an activation message indicating a second set of cells of the target base station to be activated.

2. The method according to claim 1 wherein the message indicating a partial completion of handover includes a message identifying at least one cell of the target base station to which the mobile station failed to perform downlink synchronization.

3. The method according to claim 1 wherein the message indicating a partial completion of handover includes a message identifying a subset of cells of the target base station, the subset of cells being a subset of the first set of cells, and the subset of cells not including all of the first set of cells.

4. The method according to claim 1 wherein the first set of cells comprises the set of cells of the target base station operating on carrier frequencies to be configured by the mobile station.

5. The method according to claim 1 wherein the first set of cells comprises the set of cells of the target base station operating on carrier frequencies to be considered for activation by the mobile station.

* * * * *